United States Patent
Sridhar et al.

(10) Patent No.: US 7,496,029 B2
(45) Date of Patent: Feb. 24, 2009

(54) SYSTEM AND METHOD FOR REACTING TO MISCABLING DEFECTS IN RESILIENT PACKET RING NETWORKS

(75) Inventors: Kamakshi Sridhar, Plano, TX (US); Fabian Willebrand, Stuttgart (DE)

(73) Assignee: Alcatel Lucent, Paris (FR)

( * ) Notice: Subject to any disclaimer, the term of this patent is extended or adjusted under 35 U.S.C. 154(b) by 1039 days.

(21) Appl. No.: 10/814,489

(22) Filed: Mar. 31, 2004

(65) Prior Publication Data

US 2005/0229083 A1 Oct. 13, 2005

(51) Int. Cl.
*G01R 31/08* (2006.01)
*H04L 1/00* (2006.01)

(52) U.S. Cl. .................................. 370/216; 370/242
(58) Field of Classification Search ................. 370/216, 370/242, 254
See application file for complete search history.

(56) References Cited

U.S. PATENT DOCUMENTS

| 2003/0043736 A1* | 3/2003 | Gonda ........................ 370/218 |
| 2003/0067871 A1* | 4/2003 | Busi et al. .................. 370/222 |
| 2003/0147345 A1* | 8/2003 | Takagi et al. ................ 370/222 |

FOREIGN PATENT DOCUMENTS

| EP | 1 303 081 A | 4/2003 |
| EP | 1 434 392 A | 6/2004 |

OTHER PUBLICATIONS

IEEE Standards Activity Department; Part 17: Resilient Packet Ring (RPR) Access Method & Physical Layer Specifications; IEEE Draft P802.17/D3.0; Nov. 12, 2003; pp. 1, 307-400.

* cited by examiner

*Primary Examiner*—Kevin C Harper

(57) ABSTRACT

System and method for handling miscabling defects in a node in a resilient packet ring ("RPR") network are described. In one embodiment, the method comprises detecting a miscabling defect at the node; setting a state of a miscabling parameter to true in a protection state machine of the node; and responsive to the setting, notifying a neighboring node of a signal failure ("SF").

16 Claims, 5 Drawing Sheets

| CURRENT STATE | CONDITIONS | ROW # | ACTIONS | NEXT STATE |
|---|---|---|---|---|
| START | RxTPFrame=TPFrameReceived() && RxTPFrame!=NULL TPFrameFromNbrOnShortPath() 502 | X | // check miscabled status and set flag<br>If (thisSpan.miscabled != isMiscabled ())<br>  StatusMod = TRUE;<br>// check for miscabling<br>if (isMiscabled())<br>  thisSpan.miscabled=TRUE; 503 | PROCESS |
| PROCESS | thisSpan.miscabled == TRUE 506 | Z | ThisSpan.admin = IDLE 508<br>if (statusMod)<br>  TransmitTPFrame=TRUE; | FINISH |

SYSTEM AND METHOD FOR REACTING TO MISCABLING DEFECTS IN RESILIENT PACKET RING NETWORKS

BACKGROUND OF THE INVENTION

1. Technical Field of the Invention

The present invention generally relates to Resilient Packet Ring ("RPR") networks. More particularly, and not by way of any limitation, the present invention is directed to system and method for reacting to miscabling defects in such networks.

2. Description of Related Art

FIG. 1 illustrates a block diagram of an RPR network 100 comprising four nodes A, B, C, and D, connected in a ring. Each node A-D is connected to adjacent nodes by at least one link in each of a clockwise and a counter-clockwise direction. In particular, in FIG. 1, links 102a-102d comprise a clockwise ring and links 104a-104d comprise a counter-clockwise ring. It will be assumed for the sake of example that the RPR protocol employed herein is the one currently being standardized as IEEE 802.17.

Miscabling is a failure condition in which packets sent by a node (e.g., node A) on one ring, such as the clockwise ring, are received on the other ring, i.e., the counter clockwise ring. Miscabling defects can eventually be remedied only manually by the operator; however, the method by which adjacent nodes react to a miscabled link affects the operation of the adjacent nodes and, in turn, the operation of the entire RPR network 100. The current IEEE 802.17 standard treats a miscabling defect as a fault condition referred to as a "Signal Fail" or "SF". This situation results in unexpected, unintended, and undesirable consequences, as will be described in detail below.

Each of FIGS. 2A-2C depicts a different miscabling situation in the RPR 100 that may occur in connection with node A. In particular, in FIG. 2A, the receiving links of node A, specifically, link 200 and link 202, are miscabled, such that node A receives packets from node B on the counterclockwise ring, rather than on the clockwise ring as expected, and receives packets from node C on the clockwise ring, rather than on the counterclockwise ring as expected. In this situation, node A will detect miscabling defects on both links 200, 202, based on topology protection ("TP") frames received from nodes B and C.

FIG. 2B illustrates a situation in which the sending links of node A, specifically, link 204 and link 206, are miscabled, such that packets from node A are received by node B on the clockwise ring, rather than on the counterclockwise ring as expected, and packets from node A are received by node C on the counterclockwise ring, rather than on the clockwise ring as expected. In this situation, node B will detect a miscabling defect on the link 204 based on TP frames received from node A. Similarly, node C will detect a miscabling defect on the link 206 based on TP frames received from node A.

FIG. 2C illustrates a situation in which both the sending and receiving links of node A, specifically, links 200-206, are miscabled. In this situation, node A will detect miscabling defects on both links 200 and 202, based on TP frames received from nodes B and C, node B will detect a miscabling defect on the link 204 based on TP frames received from node A, and node C will detect a miscabling defect on the link 206 based on TP frames received from node A.

Currently, the solution for all three types of miscabling defects illustrated in FIGS. 2A-2C is to isolate node A, enable edge status on both sides of node A, on the side of node B that, absent a miscabling defect, interfaces with node A, and on the side of node C that, absent a miscabling defect, interfaces with node A. This technique is illustrated in FIG. 3. The IEEE 802.17 standard implementation assumes that only adjacent nodes can detect miscabling defects.

Referring to FIG. 2B, in the current implementation of the IEEE 802.17 standard, in response to the illustrated miscabling condition, at node B or C, a TP frame is received from node A and forwarded to a Protection State Machine ("PSM") within node B or C. The PSM within node B or C runs as if there were no miscabling defect. This is because in the current IEEE 802.17 standard implementation, detection of miscabling is not performed inside the PSM, but within a Topology Database State Machine ("TDSM"). After the PSM, the TDSM runs. As previously indicated, the miscabling defect will be detected within the TDSM and a flag is set to true.

The standard does not indicate what entity is to read this flag or when it will be read. Moreover, the standard states that the node detecting the miscabling defect should go into Signal Fail ("SF") state and remain there until the miscabling is cleared.

As previously indicated, miscabling is not treated as a separate condition inside the PSM and is lumped together with the SF condition. This results in unintended consequences. Miscabling may be overwritten by other failure conditions at nodes B or C, such as SF status, or by conditions elsewhere in the network. As a result, in the prior art, new information from the hardware indicating a Signal Degrade ("SD") condition on the link will simply overwrite the SF status because the SD condition comprises newer information about the situation on the link. Moreover, because SD conditions have lower priority than SF conditions, the original miscabling information on nodes B and C will be lost. This is an undesirable result. Furthermore, an SD on a first link may be preempted by a worse condition on another link, such as SF, elsewhere in the network 100 according to the IEEE 802.17 standard implementation. In this situation, the miscabled link enters the IDLE state and hence becomes fully operational. Again, in this situation, the error due to the miscabling defect is lost.

If miscabling is treated as an SF condition, then an SD condition received from the hardware is lost. In particular, if new hardware conditions are ignored and the node remains in an SF condition, information received from hardware indicating an SD condition is lost. After clearance of the miscabling defect, the link returns to IDLE instead of SD. This is clearly not a desirable result.

SUMMARY OF THE INVENTION

One embodiment is a method for handling miscabling defects in a node in a resilient packet ring ("RPR") network. The method comprises detecting a miscabling defect at the node; setting a state of a miscabling parameter to true in a protection state machine of the node; and responsive to the setting, notifying a neighboring node of a signal failure ("SF").

Another embodiment is a system for handling miscabling defects in a node in a resilient packet ring ("RPR") network. The system comprises means for detecting a miscabling defect at the node; means for setting a state of a miscabling parameter to true in a protection state machine of the node; and means for notifying a neighboring node of a signal failure ("SF").

Another embodiment is a system for handling miscabling defects in a node in a resilient packet ring ("RPR") network. The system comprises logic for detecting a miscabling defect at the node; a protection state machine ("PSM"), wherein a state of a miscabling parameter is set to true responsive to the detecting; and a packet generator for generating a packet to notify a neighboring node of a signal failure ("SF").

BRIEF DESCRIPTION OF THE DRAWINGS

A more complete understanding of the present invention may be had by reference to the following Detailed Description when taken in conjunction with the accompanying drawings wherein:

FIG. 5 depicts a Protection State Machine ("PSM") of the node of FIG. 4; and

DETAILED DESCRIPTION OF THE DRAWINGS

Figure 1:
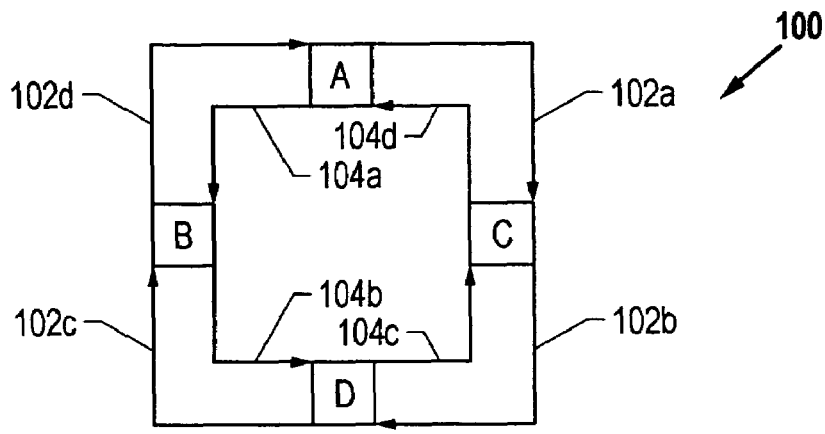
FIG. 1 depicts a block diagram of an RPR network in accordance with one embodiment.
Figure 2A:
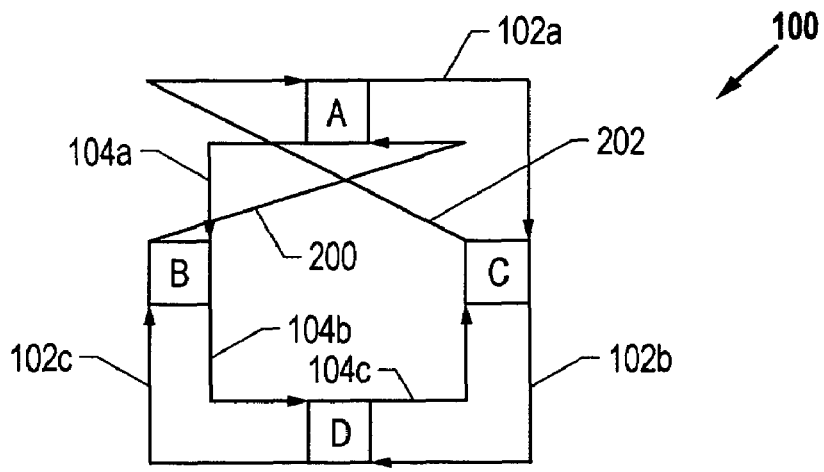
FIGS. 2A-2C depict various miscabling defects possible in the RPR network of FIG. 1.
Figure 2B:
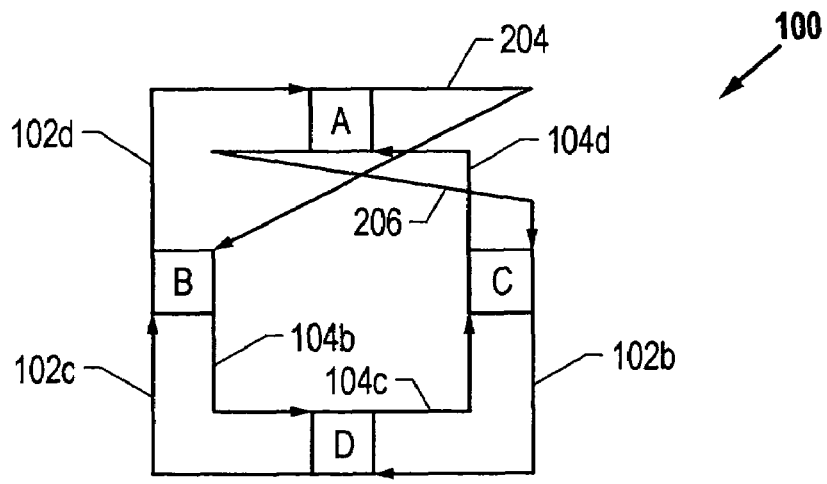
Figure 2C:
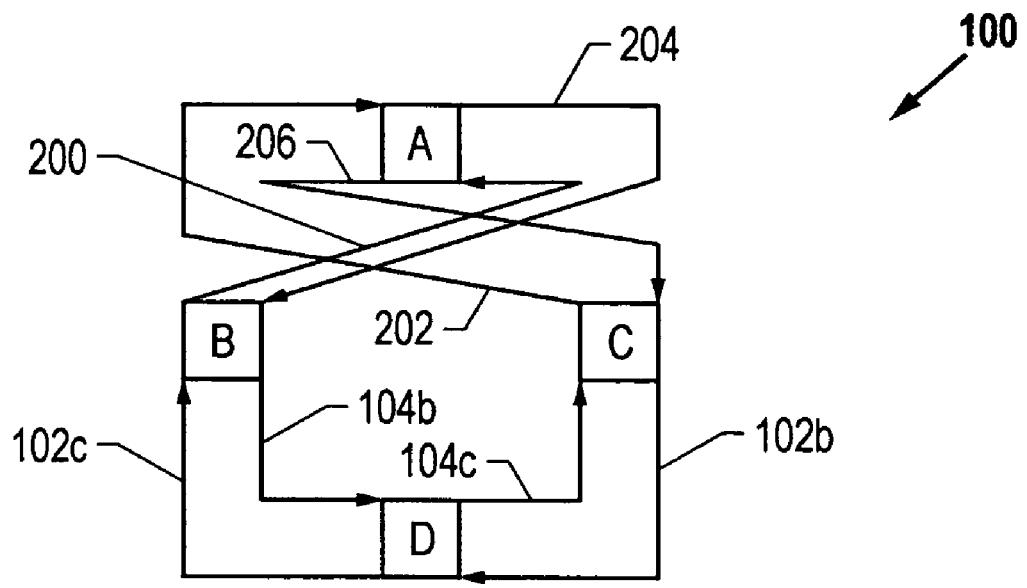
Figure 3:
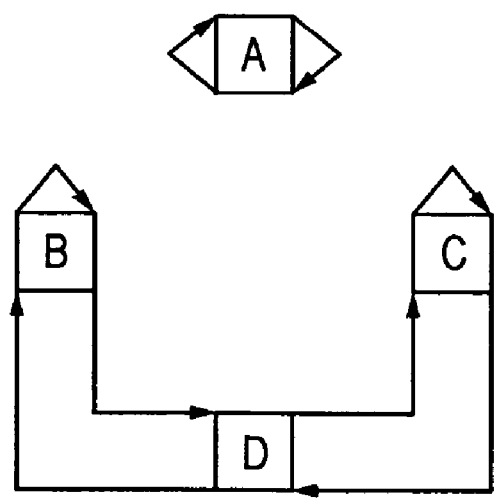
FIG. 3 depicts a prior art solution to the miscabling defects illustrated in FIGS. 2A-2C.

In the drawings, like or similar elements are designated with identical reference numerals throughout the several views thereof, and the various elements depicted are not necessarily drawn to scale.

Figure 4:
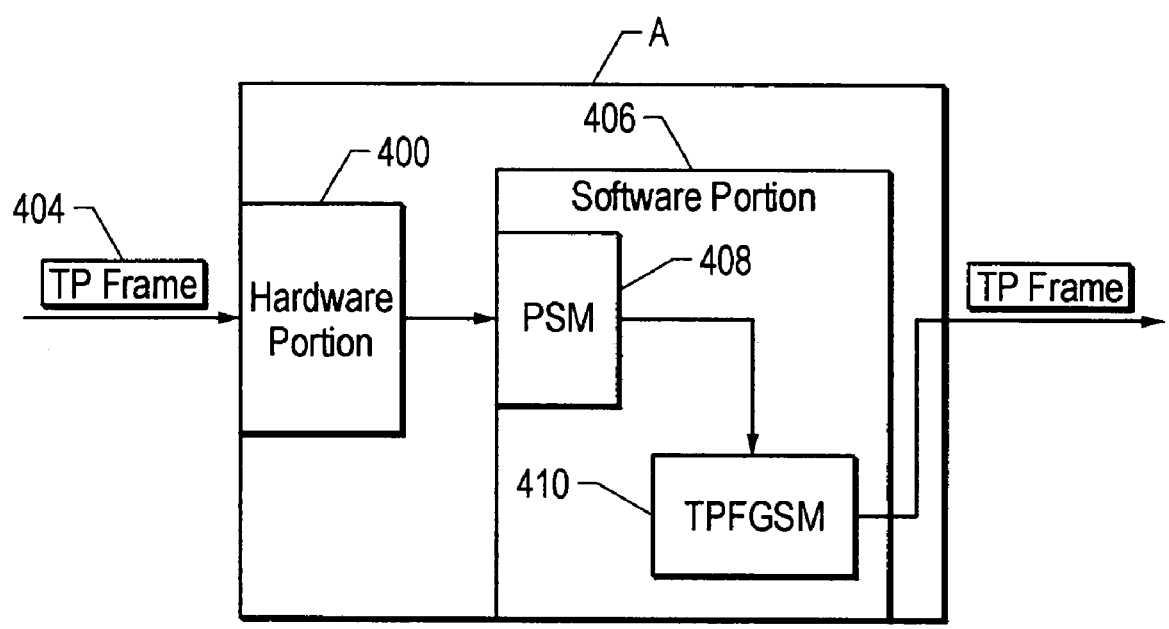
FIG. 4 depicts a more detailed block diagram of a node of the RPR network of FIG. 1.

Referring again to FIG. 1, every TP frame in the network 100 has a field referred to as a "ring identifier" ("RI") that identifies on which ring of the network 100 the frame should be. FIG. 4 is a more detailed block diagram of the node A illustrated in FIG. 1. It will be recognized that each of the nodes of the RPR network 100 will have similar features as those shown in and described with reference to FIG. 4. As illustrated in FIG. 4, when a hardware portion 400 of the node A receives a TP frame 404, it passes the frame to a software portion 406 of the node A together with information identifying the ring on which the frame was actually received. As previously noted, an RI field of the TP frame 404 identifies the ring on which the frame should have been received. For purposes of explanation, it will be assumed that the TP frame 404 was sent to node A by the node B; accordingly, the RI field of the frame identifies the clockwise ring. As shown in FIG. 4, the software portion 406 includes a PSM 408 and a TP Frame Generation State Machine ("TPFGSM") 410, the functions of which will be described in greater detail below.

The software portion 406 compares the information from the RI field of the frame 404 to the information from the hardware portion 400 identifying the ring on which the frame 404 was actually received. If the information is not the same, a miscabling defect exists somewhere in the network. If a Time-To-Live ("TTL") value in the TP frame 404 is set to MAX_STATIONS, the miscabling defect is directly adjacent the node A; that is, between nodes B and A. Conversely, if the information is the same, there is no miscabling defect in the network and everything is in an IDLE, or ideal, state.

In one embodiment, instead of using one of the states "thisSpan.admin" or "thisSpan.status" to store the information that there is a miscabling defect, a new state "thisSpan.miscabled" is created and used to store the miscabling defect. FIG. 5 which illustrates a relevant portion of the PSM 408. As shown in FIG. 5, the PSM 408 comprises a plurality of rows corresponding to states. As shown in FIG. 5, an entry in a first column of a row indicates an initial state of the PSM 408. An entry in a second column of a row indicates one or more status conditions to be examined. An entry in a third column indicates a current row number in the PSM 408. An entry in a fourth column indicates actions to be taken (e.g., variables to be set) upon the status conditions set forth in the second column entry being met. An entry in a fifth column indicates the next state to which to proceed.

It should be noted that if the status conditions set forth in the second column entry are not met, execution proceeds to the next row of the PSM 408 and the process is repeated. It will be recognized that the order in which status conditions are set forth in the PSM 408 corresponds to their relative priorities. For example, status conditions set forth in a third row ("ROW 3") of the PSM 408 have a higher priority than those set forth in a tenth row ("ROW 10") of the PSM.

In the illustrated embodiment, responsive to receipt by the node 402 of a TP frame from a neighboring node, a corresponding row 500 of the PSM 408 is entered. As described above, because the status conditions set forth in an entry 502 of the second column of the row 500 are met, an entry 503 in the fourth column of the row 500 is checked to determine whether there is a miscabling defect. If so, the state thisSpan.miscabled is set to TRUE. Moreover, whenever the state thisSpan.miscabled changes, a variable "StatusMod" is set to TRUE to trigger the transmission of a TP frame or to enter a Wait To Restore ("WTR") until the problem is cleared.

In addition to the new state "thisSpan.miscabled", which is set to TRUE under the conditions set forth above, in accordance with one embodiment, a new row 504 is added to the PSM 408. In particular, the new row 504 is entered when thisspan.miscabled is set to TRUE (entry 506) and results in the variable thisspan.admin being set to IDLE (entry 508) so that the state changes such as Force Switch ("FS") or Manual Switch ("MS") can be made as necessary. Additionally, if StatusMod bit is set to true, TransmitTPFrame is also set to TRUE to trigger the transmission of a TP frame (entry 508).

Additionally, in accordance with one embodiment, the row 500 of the PSM 408 is modified. In particular, if the received frame is not NULL and the frame is received from the neighboring node on a short path, then if a miscabling error exists, thisSpan.miscabled is set to TRUE; otherwise, StatusMod is set to true, indicating a change in the hardware status that is due to some condition other than miscabling.

Finally, in accordance with one embodiment, new conditions are added inside the TPFGSM 410, as described in detail below. This implementation is internal to the nodes that are miscabled or adjacent the miscabled node (e.g., nodes A, B, and C). Other nodes (e.g., node D) do not need to be and therefore are not apprised of the distinction between a miscabling defect and SF; they are simply notified that an SF has occurred.

Accordingly, within the TPFGSM 410, which generates TP frames to send to other nodes, there is a need to signal SF to outside conditions. The following code segment within the TPFGSM 410 is used for that purpose:

```
if(thisSpan.miscabled == TRUE && thisSpan.admin!=FS)
    sendOutStatus = SF;
else
    sendOutStatus = max(thisSpan.status,thisSpan.admin)
```

Specifically, the above-represented code segment operates as follows. If the span is miscabled (thisSpan.miscabled==TRUE) and the admin status of the span is not FS (thisSpan.admin!=FS), then other nodes are informed that there is an SF condition on the link (sendOutStatus=SF). If the foregoing is not the case, other nodes are informed of the worst condition between thisSpan.status and thisSpan.admin (sendOutStatus=max(thisSpan.status, thisSpan.admin). This would be the case, for example, if the link is not miscabled or if the link is miscabled but the admin status is MS.

During a miscabling condition, the current state of the PSM 408 cannot be overwritten by a condition sent from the hardware, such as an SD. As long as the PSM of a node remains in a miscabling state (thisSpan.miscabled==TRUE), it is able to receive and save SD or SF information from the hardware. The priority of the miscabling state is between FS and SF and thus does not affect existing priorities. A node will ignore an MS, or IDLE command from the operator, but will react on an FS, as this is the highest priority protection event. A clearance of a manually set FS condition leads again to the row 504 of the PSM 408, as the miscabling state is still true. As previously noted, this miscabling state is just for internal use within the node. TP frames sent out to other nodes contain either SF, in case there is no FS set, or FS if the operator manually sets that state.

Figure 6:
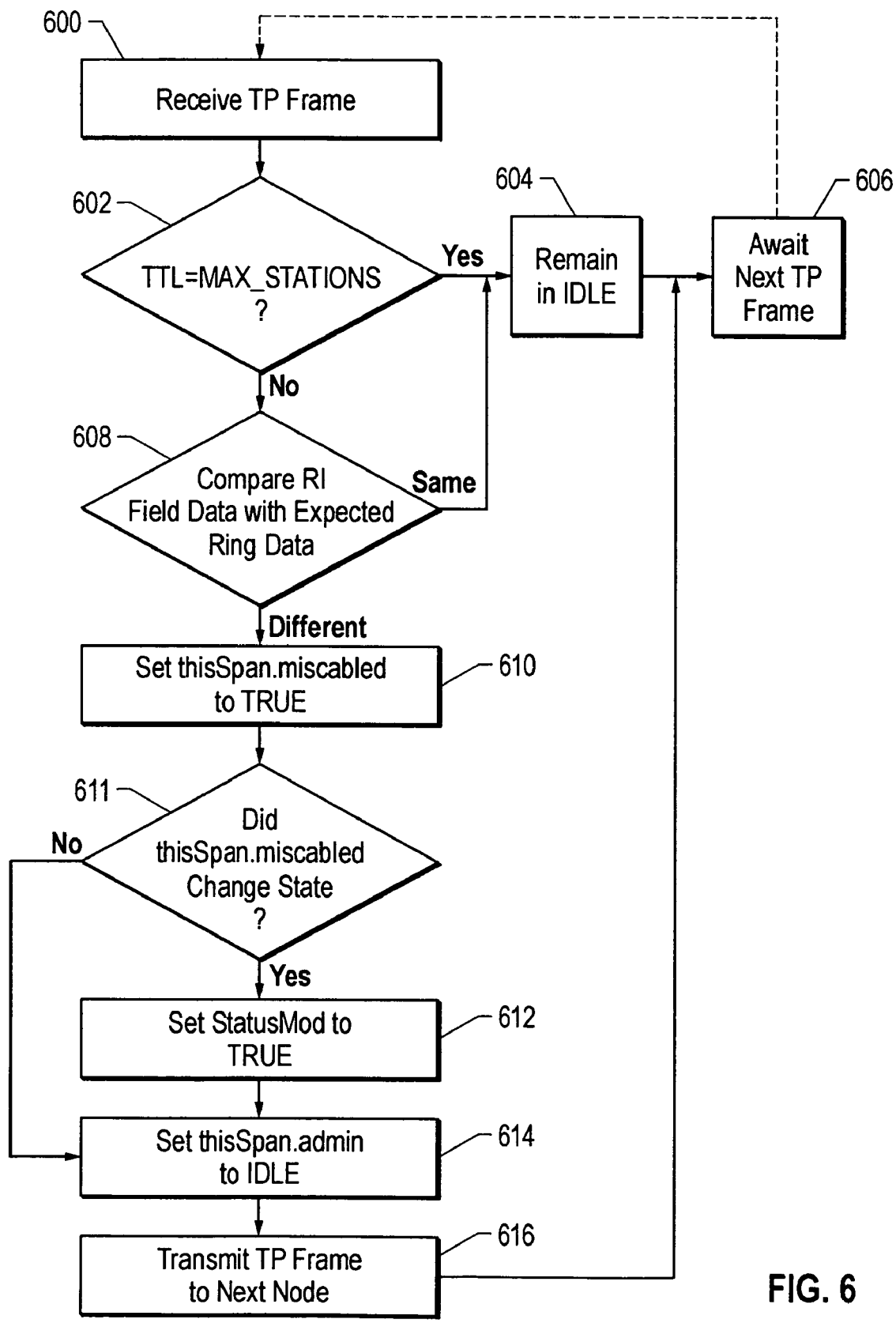
FIG. 6 depicts a flowchart of the operation of one embodiment.

FIG. 6 is a flowchart illustrating operation of one embodiment. In step 600, a TP frame is received at a node. In step 602, a determination is made whether TTL is equal to MAX_STATIONS. If so, execution proceeds to step 604, in which the node remains in IDLE state, and then to step 606, in which it awaits receipt of the next TP frame, at which point, execution returns to step 600. If a negative determination is made in step 602, execution proceeds to step 608.

In step 608, a determination is made whether the data contained in the RI field of the received frame is the same as the data stored at the node identifying the ring on which the packet was expected. If so, execution proceeds to step 604; otherwise, execution proceeds to step 610. In step 610, thisSpan.miscabled is set to TRUE. In step 611, a determination is made whether the state of thisSpan.miscabled has changed. If so, execution proceeds to step 612, in which the parameter StatusMod is set to TRUE; otherwise, execution proceeds directly to step 614. In step 614, thisSpan.admin is set to TRUE. In step 616, a TP frame is transmitted to the next node. Execution then proceeds to step 606.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A method for handling miscabling defects in a node in a resilient packet ring ("RPR") network, the method comprising:
    responsive to receipt of a packet on a first ring of the network, detecting a miscabling defect at the node, wherein the detecting a miscabling defect at the node comprises:
        determining that a time to live field in the received packet is set to maximum hops; and
        determining that a ring identification field in the received packet does not identify the first ring;
    setting a state of a miscabling parameter to true in a protection state machine of the node; and
    responsive to the setting, notifying a neighboring node of a signal failure ("SF").

2. The method of claim 1 wherein the received packet comprises a topology protection ("TP") frame.

3. The method of claim 1 wherein the notifying comprises sending a packet to the neighboring node.

4. The method of claim 1 farther comprising, responsive to the setting, setting an administrative parameter to an idle state.

5. The method of claim 1 further comprising, responsive to a change of state of the miscabling parameter, setting a state of a status modification parameter to true.

6. The method of claim 5 wherein the notifying is performed responsive to the state of the status modification parameter being set to true.

7. A system for handling miscabling defects in a node in a resilient packet ring ("RPR") network, the system comprising:
    means for detecting a miscabling defect at the node, wherein the means for detecting a miscabling defect at the node comprises:
        means for determining that a time to live field in the received packet is set to maximum hops; and
        means for determining that a ring identification field in a packet received on a first ring of the network does not identify the first ring;
    means for setting a state of a miscabling parameter to true in a protection state machine of the node; and
    means for notifying a neighboring node of a signal failure ("SF").

8. The system of claim 7 wherein the received packet comprises a topology protection ("TP") frame.

9. The system of claim 7 wherein the means for notifying comprises means for generating a packet to the neighboring node.

10. The system of claim 7 further comprising means for setting an administrative parameter to an idle state responsive to the setting of a state of the miscabling parameter to true.

11. The system of claim 7 farther comprising means responsive to a change of state of the miscabling parameter for setting a state of a status modification parameter to true.

12. A system for handling miscabling defects in a node in a resilient packet ring ("RPR") network, the system comprising:
    hardware for receiving a packet on a ring of the network;
    logic for detecting a miscabling defect at the node, wherein the logic for detecting a miscabling defect at the node comprises:
        logic for determining that a time to live field in the received packet is set to maximum hops;
        logic for comparing a ring identification field of the received packet with an identity of the ring; and
        logic for determining a miscabling defect exists if the ring identification field does not identify the ring on which the packet was received;
    a protection state machine ("PSM"), wherein a state of a miscabling parameter is set to true responsive to the detecting; and
    a packet generator for generating a packet to notify a neighboring node of a signal failure ("SF").

13. The system of claim 12 wherein the received packet comprises a topology protection ("TP") frame.

14. The system of claim 12 wherein the packet generator comprises a topology protection frame generation state machine ("TPFGSM").

15. The system of claim 12 further comprising logic for setting an administrative parameter of the PSM to an idle state responsive to the setting of a state of the miscabling parameter to true.

16. The system of claim 12 further comprising logic responsive to a change of state of the miscabling parameter for setting a state of a status modification parameter to true.

* * * * *